(12) United States Patent
Takamura et al.

(10) Patent No.: US 7,922,780 B2
(45) Date of Patent: Apr. 12, 2011

(54) METHOD AND APPARATUS FOR HYDROCARBON REFORMING BASED ON OXYGEN-PERMEABLE MEMBRANE

(75) Inventors: Hitoshi Takamura, Sendai (JP); Masuo Okada, Sendai (JP); Masayuki Ogawa, Sendai (JP); Tomoyuki Saito, Tokyo (JP)

(73) Assignees: Japan Science and Technology Agency, Kawaguchi-shi (JP); TDK Corporation, Tokyo (JP)

( * ) Notice: Subject to any disclaimer, the term of this patent is extended or adjusted under 35 U.S.C. 154(b) by 379 days.

(21) Appl. No.: 11/992,894

(22) PCT Filed: Oct. 16, 2006

(86) PCT No.: PCT/JP2006/320532
§ 371 (c)(1),
(2), (4) Date: Mar. 31, 2008

(87) PCT Pub. No.: WO2007/046314
PCT Pub. Date: Apr. 26, 2007

(65) Prior Publication Data
US 2010/0178238 A1    Jul. 15, 2010

(30) Foreign Application Priority Data
Oct. 19, 2005   (JP) .................... 2005-303915

(51) Int. Cl.
*B01J 7/00* (2006.01)
*H01M 8/06* (2006.01)
*C01B 3/36* (2006.01)
*B01D 53/22* (2006.01)
*B01D 59/12* (2006.01)

(52) U.S. Cl. ............... 48/61; 48/197 R; 96/4; 96/5

(58) Field of Classification Search .......... 48/61, 197 R; 422/129; 429/650
See application file for complete search history.

(56) References Cited

U.S. PATENT DOCUMENTS
| | | | |
|---|---|---|---|
| 5,865,878 A * | 2/1999 | Drnevich et al. | 95/54 |
| 6,695,983 B2 | 2/2004 | Prasad et al. | |
| 6,893,619 B1 * | 5/2005 | James et al. | 422/198 |
| 2001/0003232 A1 * | 6/2001 | Kleefisch et al. | 48/198.2 |
| 2005/0142053 A1 | 6/2005 | Takamura et al. | |
| 2006/0233700 A1 * | 10/2006 | Chellappa et al. | 423/648.1 |

FOREIGN PATENT DOCUMENTS
| | | |
|---|---|---|
| JP | 2004-51428 A | 2/2004 |
| JP | 2005-281077 A | 10/2005 |

\* cited by examiner

*Primary Examiner* — Alexa D Neckel
*Assistant Examiner* — Matthew J Merkling
(74) *Attorney, Agent, or Firm* — Birch, Stewart, Kolasch & Birch, LLP

(57) ABSTRACT

To provide a method and an apparatus for reforming a hydrocarbon with a prolonged life of an oxygen-permeable membrane and a high recovery rate.

The oxygen-permeable membrane absorbs the free energy change, $\Delta G$, of a partial oxidation reforming reaction and then converts it into work for oxygen isolation and Joule heat, Q. Here, as seen in Table 1 and FIG. 1, $\Delta G$ of the partial oxidation reforming reaction is approximately ten times larger than $\Delta H$, and further increases as the temperature increases. The generated Joule heat, Q, has to be removed at a high efficiency, and this removal process is achieved by returning a portion of the Joule heat to the system as the entropy change, $T\Delta S$, of the partial oxidation reaction itself and by steam reforming using the total energy change, $\Delta H$.

4 Claims, 5 Drawing Sheets

[Fig. 1]
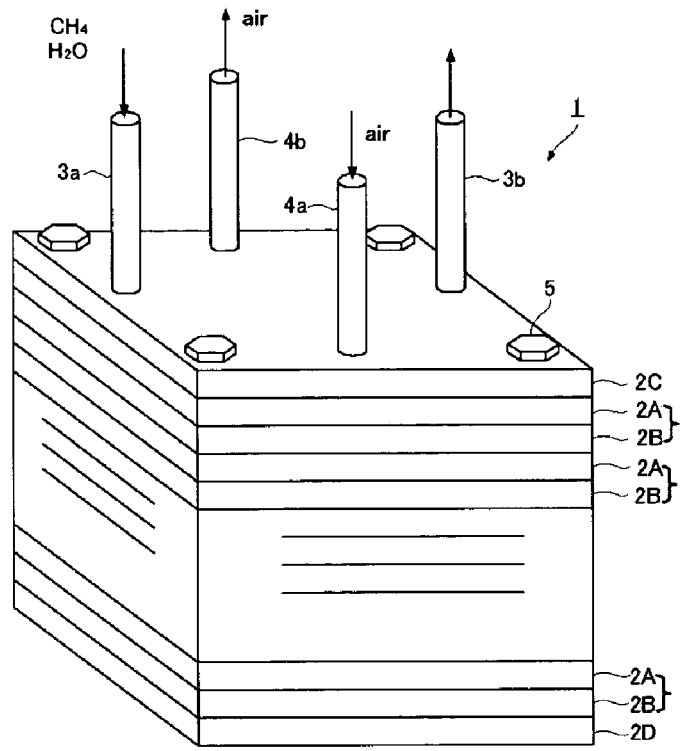
[Fig. 2]
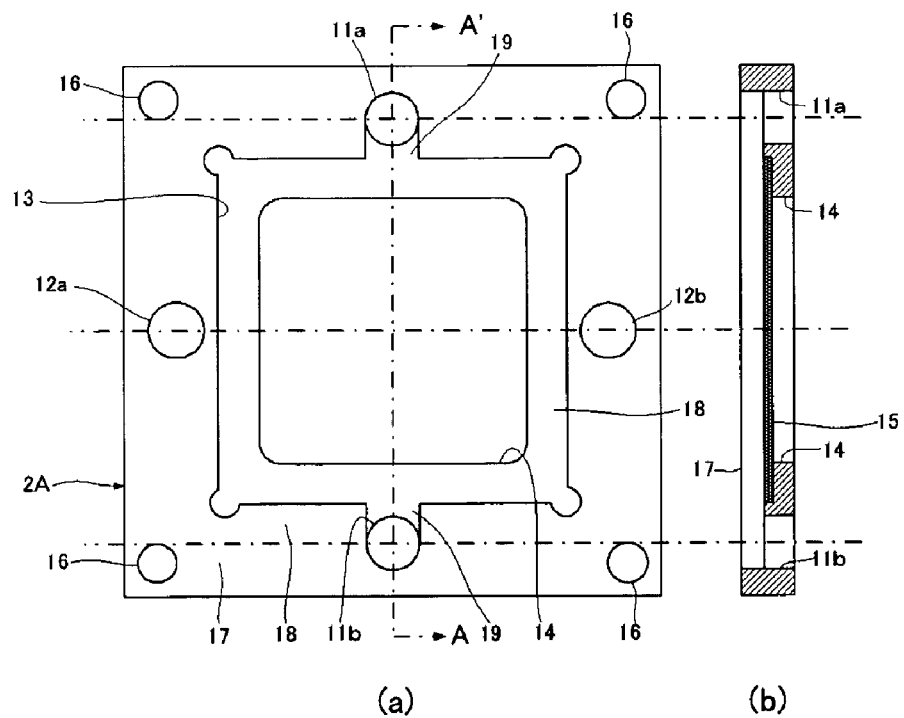
(a) (b)

[Fig. 3]
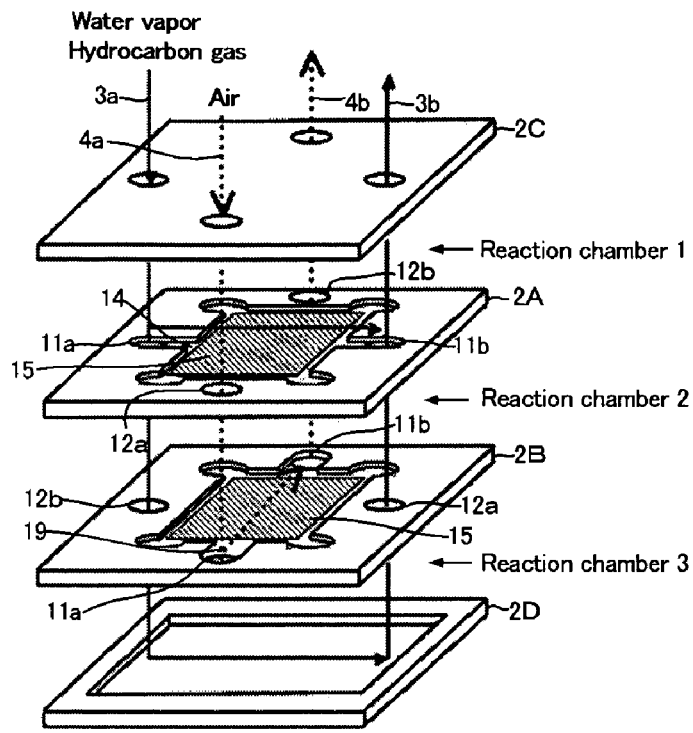
[Fig. 4]
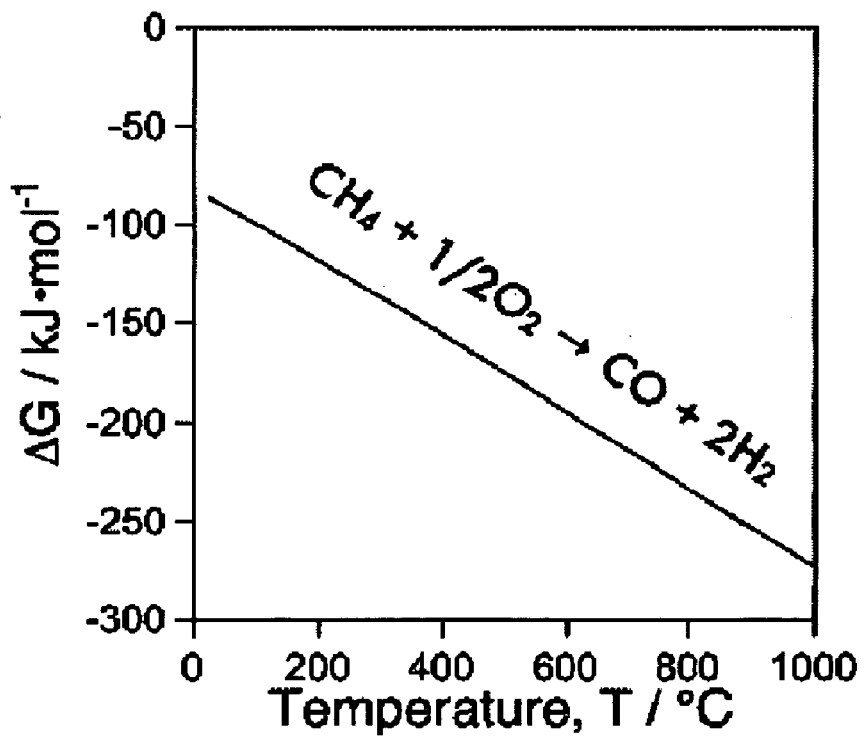

[Fig. 5]
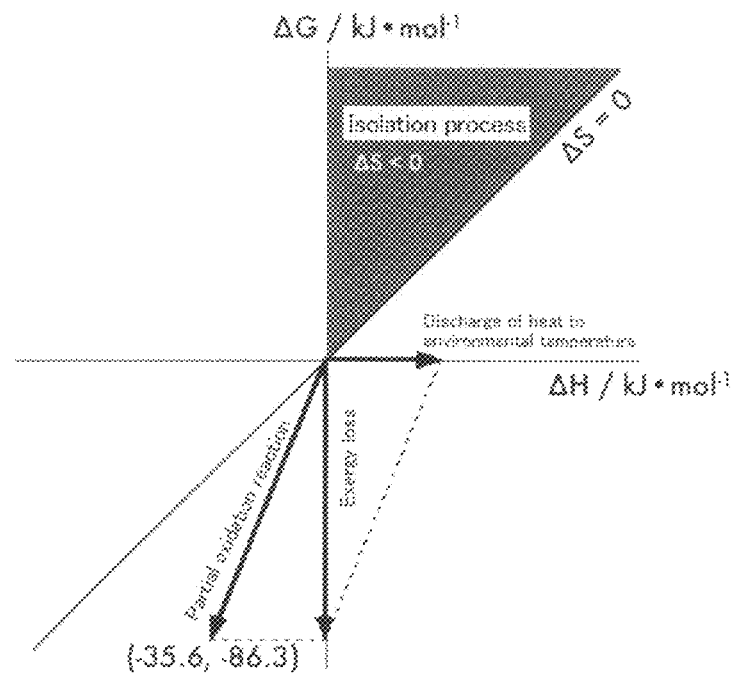
[Fig. 6]
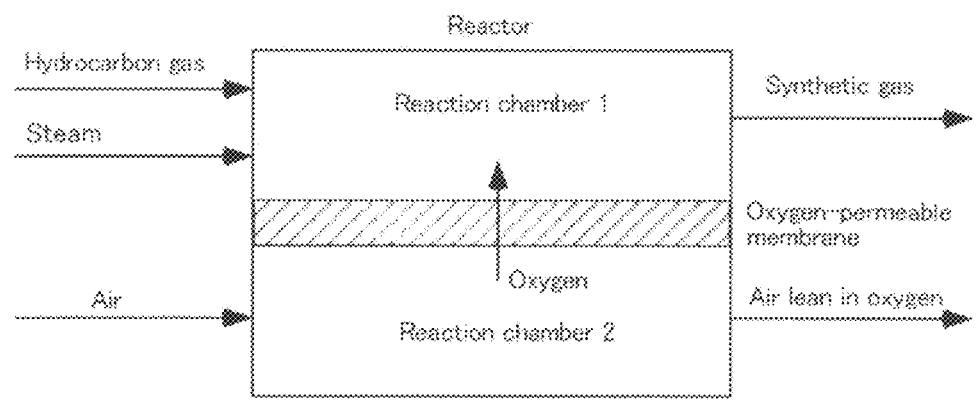

[Fig. 7]
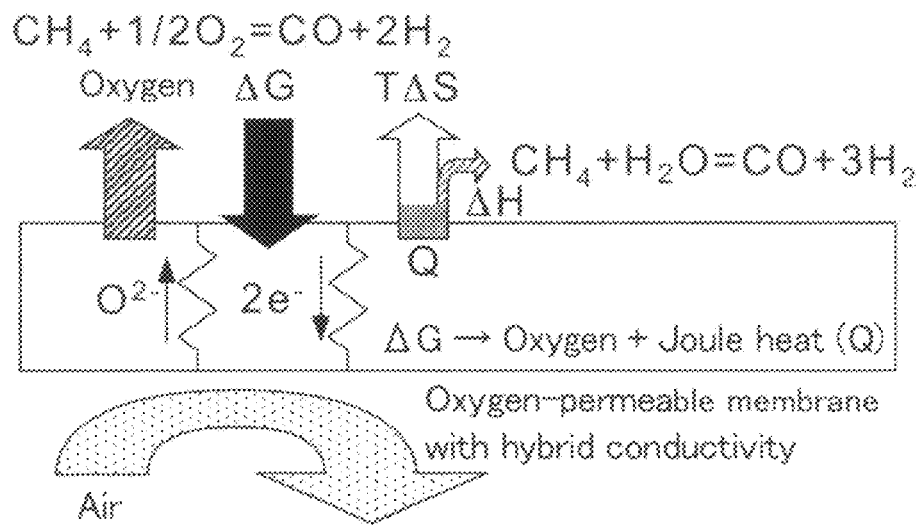
[Fig. 8]
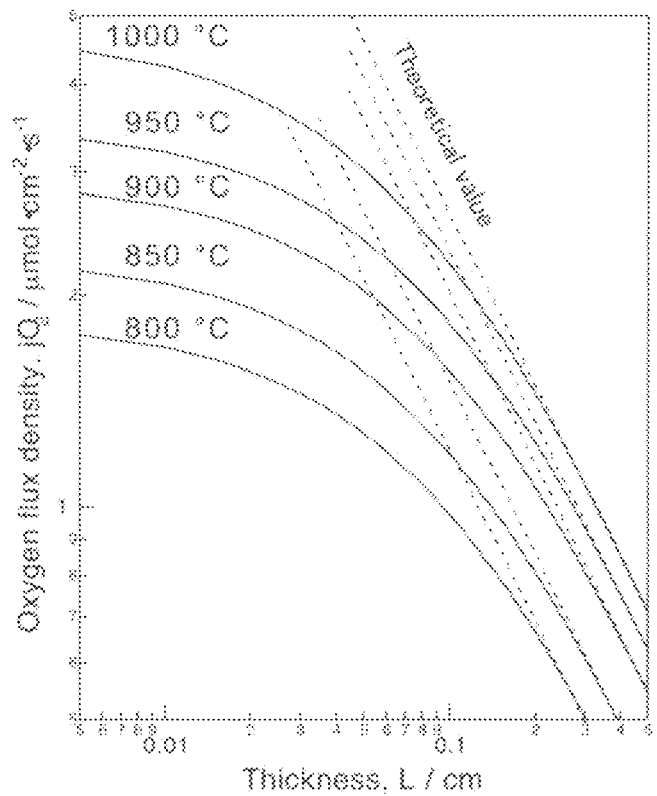

[Fig. 9]
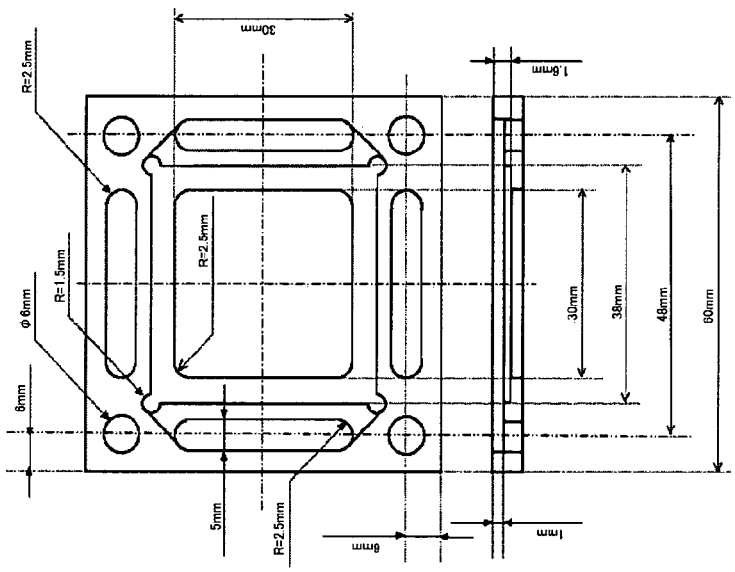
[Fig. 10]
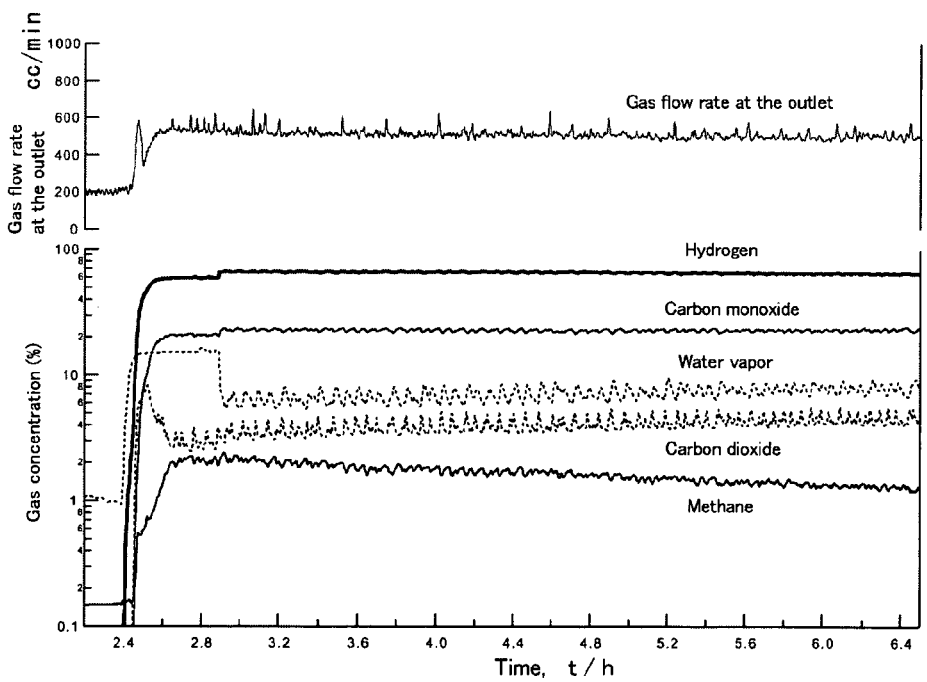

METHOD AND APPARATUS FOR HYDROCARBON REFORMING BASED ON OXYGEN-PERMEABLE MEMBRANE

TECHNICAL FIELD

The present invention relates to a method and an apparatus for reforming a hydrocarbon using an oxygen-permeable membrane, and more particularly to such a method and an apparatus for reforming a hydrocarbon with a prolonged life of an oxygen-permeable membrane and a high recovery rate.

BACKGROUND ART

Techniques for producing hydrogen or a synthetic gas constituted of hydrogen, carbon monoxide and other compounds from a natural gas containing methane as its main ingredient or another hydrocarbon gas include steam reforming, partial oxidation reforming and carbon dioxide gas reforming. Table 1 lists the formulae representing such reforming reactions and chemical reactions that may occur during these reforming reactions as well as related thermodynamic constants, taking methane as an example starting material.

TABLE 1

| | Reaction | T (K) | ΔG (kJ/mol) | ΔH (kJ/mol) | TΔS (kJ/mol) |
|---|---|---|---|---|---|
| (1) Steam reforming | $CH_4 + H_2O \rightarrow CO + 3H_2$ | 1000 | −27.0 | 225.7 | 252.7 |
| (2) Partial oxidation reforming | $CH_4 + \tfrac{1}{2}O_2 \rightarrow CO + 2H_2$ | 1000 | −219.6 | −22.1 | 197.5 |
| (3) Carbon dioxide reforming | $CH_4 + CO_2 \rightarrow 2CO + 2H_2$ | 1000 | −23.8 | 260.5 | 284.3 |
| (4) Shift reaction | $CO + H_2O \rightarrow CO_2 + H_2$ | 1000 | −3.1 | −34.8 | −31.7 |
| (5) Complete oxidation reforming | $CH_4 + 2O_2 \rightarrow CO_2 + 2H_2O$ | 1000 | −800.7 | −800.5 | 0.2 |

In practical settings, these basic reaction formulae are combined with each other, and the reactions used to produce hydrogen are, for example, described as follows:

$$(1)+(4) \quad CH_4 + 2H_2O \rightarrow CO_2 + 4H_2 \quad \Delta H = 190.9 \text{ kJ/mol (endothermic)} \qquad \text{Formula (6)}$$

$$(2)+(4) \quad CH_4 + 1/2 O_2 + H_2O \rightarrow CO_2 + 3H_2 \quad \Delta H = -56.9 \text{ kJ/mol (exothermic)} \qquad \text{Formula (7)}$$

$$((1)+(4)+(5))/2 \quad CH_4 + O_2 \rightarrow CO_2 + 2H_2 \quad \Delta H = -304.8 \text{ kJ/mol (exothermic)} \qquad \text{Formula (8)}.$$

Starting from the top, these reactions are called steam reforming, autothermal reforming and partial oxidation reforming. Production of a synthetic gas also follows a similar manner, and it is based on the following formula:

$$((1)+(2))/2 \quad CH_4 + 1/4 O_2 + 1/2 H_2O \rightarrow CO + 5/2 H_2 \text{ (endothermic)} \qquad \text{Formula (9)}.$$

This formula represents commonly-used autothermal reforming in which steam and oxygen are used in combination.

Considering the features of such reactions in terms of the substance (oxygen or steam) used to reform the gas, the use of steam is excellent in the production quantity of hydrogen but has difficulty in starting the reaction because of its high endothermic tendency. On the other hand, the use of oxygen is not so excellent in the production quantity of hydrogen but allows the reaction to be readily started because of its high exothermic tendency. Here it should be noted that the steam reforming (Formula (1)) requires heat for the combustion of one mole of hydrogen molecules to produce hydrogen molecules at the quantity more by one mole than those the partial oxidation reforming (Formula (2)) does. Therefore, under the conditions without exhaust heat having a temperature high enough to allow the steam reforming, both the steam reforming and the partial oxidation reforming would achieve the very same theoretical efficiency. So if pure oxygen is made easily available at low cost in some way, then the partial oxidation reforming provides an ideal reforming method excellent in both ease in starting the reaction and efficiency.

As a method that can provide the partial oxidation reaction and oxygen isolation simultaneously, partial oxidation reforming using an oxygen-permeable membrane (also called an oxygen-isolating membrane or an oxygen-permeating ceramics) has recently attracted attention. This method uses a material having both oxide ionic conductivity and electronic conductivity (an oxide-ion/electron hybrid conductor) as a separator that partitions a hydrocarbon gas and air, thereby isolating pure oxygen necessary in the partial oxidation reforming from the air by taking ΔG of the partial oxidation reaction (in more specific terms, the oxygen concentration gradient) as a driving force, in order to promote further partial oxidation reactions at the side of the hydrocarbon gas. Patent Documents 1 and 2 are disclosed as patents based on this principle. Many kinds of materials of oxygen-permeable membranes, such as ones described in Patent Documents 3 to 5, have also been reported.

However, such an oxygen-permeable membrane requires ionization of oxygen atoms for permeation thereof, and thus the oxide ion transport and the electron transport in the reverse direction cause the generation of large Joule heat (heat generation due to electric resistance) within the membrane. So in a system with insufficient thermal balance, such a membrane would be lacking in oxygen permeability, and eventually broken. As a countermeasure against this problem, Patent Document 1 discloses a technique in which the heat generated in association with the partial oxidation reforming reaction (ΔH) is regarded as excess heat and is removed by the endothermic reaction of the steam reforming until the most of the heat is spent; however, the necessity of removing Joule heat generated within the oxygen-permeable membrane is not discussed in this patent document.

Furthermore, there has been no disclosure about an effective reforming apparatus that can downsize a partial oxidation reforming system using an oxygen-permeable membrane.

Patent Document 1: Japanese Unexamined Patent Application Publication No. 2000-26103

Patent Document 2: Japanese Unexamined Patent Application Publication No. 2005-145760

Patent Document 3: WO2003/084894

Patent Document 4: Japanese Unexamined Patent Application Publication No. 2001-93325

Patent Document 5: Japanese Unexamined Patent Application Publication No. 2005-281077

Patent Document 6: Japanese Unexamined Patent Application Publication No. 2005-281086

Patent Document 7: Japanese Unexamined Patent Application Publication No. 2004-149332

Patent Document 8: Japanese Unexamined Patent Application Publication No. 2003-2610

DISCLOSURE OF INVENTION

Problems to be Solved by the Invention

It is very important to recognize that, in the removal of Joule heat generated within an oxygen-permeable membrane, not only an endothermic reaction due to addition of steam but also a partial oxidation reforming reaction (as a whole, an exothermic reaction) significantly contributes through the $T\Delta S$ term of Formula (2) in Table 1. In other words, a technique that allows the partial oxidation reforming and steam reforming reactions to occur near the membrane at an appropriate ratio and a high efficiency, as well as the structural design of a reforming apparatus for carrying out this technique, is demanded.

An object of the present invention is to provide a thermodynamics-based specific method to control exothermic (partial oxidation reforming) and endothermic (steam reforming) reactions for removing Joule heat generated in association with reforming of a hydrocarbon gas using an oxygen-permeable membrane.

Another object of the present invention is to provide a downsized apparatus that enables stable and efficient partial oxidation reforming using an oxygen-permeable membrane.

Means for Solving the Problems

The inventors made an extensive investigation focusing on the use of heat generated by a steam reforming reaction as an additional cooling mechanism, as well as the $T\Delta S$ term associated with a partial oxidation reaction, to protect an oxygen-permeable membrane from being overheated by Joule heat, and eventually completed the invention described below after confirmation tests. This invention is claimed as follows.

The invention according to claim 1 is a method for reforming a hydrocarbon including a partial oxidation reforming reaction and a steam reforming reaction of a hydrocarbon as a starting material using oxygen isolated by an oxygen-permeable membrane, thereby producing a gas containing hydrogen, wherein overheating of the oxygen-permeable membrane is prevented by removing Joule heat generated in association with isolation of the oxygen.

The invention described above is further characterized in that the Joule heat excluding energy absorbed by an entropy increase associated with the partial oxidation reforming reaction is used as heat to be absorbed in association with the steam reforming reaction (claim 2).

Actions of the inventions described above are explained in detail below. FIG. 4 is a diagram that shows the temperature dependence of the free energy change, $\Delta G$, of the relevant partial oxidation reformation reaction. In this reaction, the free energy change, $\Delta G$, monotonically increases as the temperature increases. Therefore, this reaction can give a large thermodynamic work to environment, and thus it should be avoided by any means that this reaction is used as just a reforming reaction from the perspective of energy efficiency. The meaning of this is explained with reference to the thermodynamic compass shown in FIG. 5. The horizontal axis represents the total energy change of the reaction, $\Delta H$, whereas the vertical axis represents the free energy change, $\Delta G$, which is effective energy (exergy). In the partial oxidation reaction occurring at a temperature of 298 K, $\Delta H=-35.6$ kJ/mol and $\Delta G=-86.3$ kJ/mol (the vector pointing to the lower left). Here, the partial oxidation reaction performed as a process accompanied by discharge of heat to environmental temperature (the vector pointing to the right) would cause $\Delta G$ ($=-86.3$ kJ/mol) to be the loss of the overall effective energy (exergy loss; the vector pointing down). To minimize this exergy loss and carry out the reaction as an energy-minimum process, combining this process with one having a vector in the reverse direction of that for the partial oxidation reaction (the hatched area) is the most effective. As for the reaction occurring in this area, $\Delta G$ is greater than zero and the entropy change, $\Delta S$, is negative. So this reaction cannot occur spontaneously (because $\Delta G$ is greater than zero) and is an ordering process (because $\Delta S$ is smaller than zero). Examples of such a process may include one in which only component B is isolated from a mixed gas consisting of components A and B. Oxygen isolation from air exactly belongs to this kind of process, thus being the most advantageous to an efficient partial oxidation reaction.

FIG. 6 shows the concept of an oxygen-permeable membrane-based hydrogen production system according to the present invention. In this system, the reactor is divided by an oxygen-permeable membrane into reaction chambers 1 and 2. A hydrocarbon gas as the starting material of hydrogen and a synthetic gas and steam as a coolant are introduced into the reaction chamber 1, whereas an oxygen-containing gas, such as air, is introduced into the reaction chamber 2. Here, the steam may be introduced in a liquid form. The oxygen-permeable membrane provided in the reactor isolates oxygen and guides it to the reaction chamber 1, where the oxygen reacts with the hydrocarbon gas to produce a synthetic gas. The resulting synthetic gas may be used as it is, or purified to produce pure hydrogen using a metal-containing hydrogen-isolating membrane described in Patent Document 7 or a hydrogen extractor based on a high-temperature proton conductor in Patent Document 8 connected to the system as a downstream step. In addition, a gas discharged from the reaction chamber 2 would be lean in oxygen. Here it is important that the oxygen-permeable membrane is protected from being overheated by Joule heat not only using sensible heat generated via the introduction of steam or water, but also using a highly endothermic steam reforming reaction.

FIG. 7 shows the principle of the removal of Joule heat from the oxygen-permeable membrane. According to this drawing, the oxygen-permeable membrane absorbs the free energy change, $\Delta G$, of a partial oxidation reforming reaction and then converts it into work for oxygen isolation and Joule heat, Q. Here, as seen in Table 1 and FIG. 4, $\Delta G$ of a partial oxidation reforming reaction is approximately ten times larger than $\Delta H$, and further increases as the temperature increases. The generated Joule heat, Q, has to be removed at a high efficiency, and this removal process is achieved by returning a portion of the Joule heat to the system as the entropy change, $T\Delta S$ (e.g., 197.5 kJ/mol at 700 K according to Table 1 (2)), of the partial oxidation reaction itself and by steam reforming utilizing the total energy change, $\Delta H$ (e.g., $-22.1$ kJ/mol at 700 K according to Table 1 (2)).

In this aspect, steam is preferably added for the steam reforming reaction in an amount corresponding to a dew point in the range of 50 to 90° C. (Claim 3). More preferably, the dew point to which the amount of steam corresponds is in the range of 70 to 80° C. (Claim 4).

Control of the incidence ratio of the partial oxidation reforming reaction to the steam reforming reaction can lead to the prevention of overheating of the oxygen-permeable membrane and the regulation of the production quantity of hydrogen. As described in the section of Examples later, the characterization analyses carried out under various conditions of steam concentrations and reforming parameters revealed that, to achieve both the prevention of overheating of the oxygen-permeable membrane and the increase in the hydrogen production quantity, steam has to be added in an amount corresponding to a dew point of at least 50° C., and the most preferably, in the range of 70 to 80° C. It has also been confirmed that, in this case, 50 to 80% of the total production quantity of hydrogen is derived from partial oxidation reforming reactions and the balance is derived from steam reforming reactions.

The invention according to Claim 5 is a stacked structure reforming apparatus including pairs of flat plate units each of which has a symmetrical shape with respect to each of two mutually perpendicular central axes extending through the center thereof, the flat plate units of each pair being rotated by 90° from each other, the pairs being stacked so that the flat plate units are alternately arranged, and, a top plate unit and a bottom plate unit that sandwich the pairs of flat plate units, wherein each of the flat plate units has a membrane-holding portion that has an opening for a reaction chamber at the center thereof, a specific-gas-permeating membrane that is held by the membrane-holding portion, and a flange portion that surrounds the membrane-holding portion and is one step higher than the membrane-holding portion, and the flange portion has a first gas-introducing manifold opening and a first gas-discharging manifold opening provided along a first central axis of the central axes so as to put the membrane-holding portion therebetween, a second gas-introducing manifold opening and a second gas-discharging manifold opening provide along a second central axis of the central axes, which is perpendicular to the first central axis, so as to put the membrane-holding portion therebetween, and a gas channel that allows the first gas-introducing manifold opening and the first gas-discharging manifold opening to communicate with the membrane-holding portion.

In the invention according to Claim 6, the abovementioned reforming apparatus is an apparatus for reforming a hydrocarbon and the specific-gas-permeating membrane is an oxygen-permeable membrane, and the reforming apparatus is configured so that a hydrocarbon gas and steam flow into the first gas-introducing manifold opening, whereas air flows into the second gas-introducing manifold opening.

To remove the Joule heat at a high efficiency, the reforming apparatus must have a structure maximizing the contact area between the gas and the membrane surface, and a shape ideal for this purpose is a flat plate, which enables maximizing the ratio of the area of the membrane to the reactor volume (the area of the membrane/the reactor volume). To realize such a flat plate-based reforming apparatus, a structure that allows a hydrocarbon gas and air to flow mutually perpendicularly into alternate layers was devised and its efficacy was demonstrated in the course of the present invention.

In the invention according to Claim 7, the abovementioned oxygen-permeable membrane is a composite oxygen-permeable membrane constituted of cerium oxide and spinel oxide.

In the invention according to Claim 8, the thickness of the abovementioned oxygen-permeable membrane is in the range of 100 μm to 1 cm.

The thickness of the oxygen-permeable membrane determines the performance of the reforming apparatus and thus is an important parameter. In general, the thinner such a membrane is the better for the purpose of improving the oxygen flux density (i.e., enhancing the oxygen supply), and in some cases, an oxygen-permeating thin film is formed on a porous substrate that allows gas to pass therethrough (e.g., see Patent Document 1). However, as seen in FIG. 7, the oxygen-permeable membrane has a function of converting the free energy change, $\Delta G$, of a partial oxidation reforming reaction to Joule heat, Q, as well as a function of isolating oxygen, so that a thin film is not always the best solution. This is because effective reforming requires the conversion of $\Delta G$ of a partial oxidation reforming reaction into Joule heat, Q, to the maximum extent. The use of a thin film is not always advantageous to the conversion of $\Delta G$ to Q because of "surface kinetics limitation," a phenomenon that the oxygen flux density is limited to a substantially constant value when using a too thin oxygen-permeable membrane.

FIG. 8 is a diagram showing the film-thickness dependence of the oxygen flux density in a composite oxygen-permeable membrane constituted of cerium oxide and spinel oxide. This drawing assumes that air flows into one side of the oxygen-permeable membrane whereas diluted hydrogen flows into the other side. As seen in the drawing, the oxygen flux density monotonically increases along the line of theoretical values with the decrease of the thickness when the thickness is in the millimeter order, but it gradually approaches a constant value once the thickness becomes smaller than a certain value. This behavior is significant at the film thickness of 0.1 mm or lower (100 μm or lower), and this means that the oxygen flux density is limited by a reaction occurring on the surface of the oxygen-permeable membrane. Under this "surface kinetics limitation," the state that the quantity of oxygen permeation, which can be converted into a current, is constant even after the decrease of the film thickness suggests a monotonic decrease in Joule heat generated by the oxygen permeation. Therefore, the use of a too thin film is inappropriate for efficiently returning $\Delta G$ of a partial oxidation reforming reaction to the reaction system as Joule heat, Q. Depending on the characteristics of the membrane, the thickness of an oxygen-permeable membrane suitable for the efficient generation of Joule heat, Q, is typically in the range of a few tens of micrometers to approximately 1 cm.

ADVANTAGES OF THE INVENTION

Overheating due to Joule heat within an oxygen-permeable membrane has never been recognized, so in a system with insufficient thermal balance, such a membrane would be lacking in the oxygen permeability, and eventually broken. In the present invention, the thermal balance is maintained via a Joule heat removal process achieved by returning a portion of Joule heat to the system as the entropy change, $T\Delta S$, of the partial oxidation reaction itself and by using the total energy change, $\Delta H$, of steam reforming. This allows the partial oxidation reforming and steam reforming reactions to occur near the oxygen-permeable membrane at an appropriate ratio and a high efficiency.

The method according to the present invention enables reforming a hydrocarbon with a high conversion rate and a prolonged life of an oxygen-permeable membrane.

Furthermore, the reforming apparatus according to the present invention enables holding an oxygen-permeable membrane and controlling a gas channel simultaneously, as well as allows a hydrocarbon gas and air to flow mutually perpendicularly into alternate layers. This makes it possible to downsize the reforming apparatus to 1/10 to 1/100 while keeping the proven efficiency of steam reforming.

BEST MODE FOR CARRYING OUT THE INVENTION

An embodiment of the present invention is described in more detail below with reference to FIGS. 1 to 3. To avoid duplication, the same numeral is assigned to the same constitution in the different drawings. Needless to say, the scope of the present invention is defined by Claims and not limited to the following embodiment.

FIG. 1 is a diagram showing the constitution of the reforming apparatus 1 according to an embodiment of the present invention. FIG. 2 details the constitution of the flat plate unit 2A that composes each layer to be stacked of the reforming apparatus 1, where (a) is a plan view and (b) is a view on the arrow A-A'. FIG. 3 is a schematic view that shows how the components of the reforming apparatus 1 are stacked.

In FIG. 1, the reforming apparatus 1 has a structure in which pairs of square flat plate units 2A and 2B are stacked so that the flat plate units 2A and 2B are alternately arranged and sandwiched between a top plate unit 2C and a bottom plate unit 2D. Although not shown in this drawing, the flat plate unit 2B has the same shape as that of the flat plate unit 2A and is rotated by 90° from the flat plate unit 2A. To the top plate unit 2C, a starting material (a hydrocarbon) gas-introducing portion 3a, a reformed gas-discharging portion 3b, an air-introducing portion 4a and an air-discharging portion 4b are connected.

In FIG. 2, the flat plate unit 2A has the opening 14 for the reaction chamber described later at its center, the membrane-holding portion 18 surrounding the opening 14, and the flange portion 17 surrounding the membrane-holding portion 18. The membrane-holding portion 18 is one step lower than the flange portion 17. The flange portion 17 has each of four manifold openings 11a, 11b, 12a and 12b at the middle of each side. The stacked flat plate units 2A and 2B make these manifold openings communicate with each other, thereby providing gas-introducing and gas-discharging manifolds. Each of the manifold openings 11a and 11b has a groove for a gas channel 19, and its depth is the same as that of the membrane-holding portion 18. The membrane-holding portion 18 holds the oxygen-permeable membrane 15. Screw holes for stacking and fixation 16 are provided on the four corners of the flat plate unit 2A.

FIG. 3 explains how a starting material gas and a reaction gas flow inside the reforming apparatus 1. For convenience of explanation, only one pair of the stacked flat plate units 2A and 2B is sandwiched between the top plate unit 2C and the bottom plate unit 2D in this drawing. As is obvious in the drawing, reaction chambers 1, 2 and 3 are respectively formed in the spaces made between the top plate unit 2C and the flat plate unit 2A, between the flat plate units 2A and 2B, and between the flat plate unit 2B and the bottom plate unit 2D.

Air is supplied from the air-introducing portion 4a to the manifold opening 11a of the flat plate unit 2B passing through the manifold opening 12a of the flat plate unit 2A, and then guided to the reaction chamber 2 by the groove 19. Subsequently, the air runs along the surface of the oxygen-permeable membrane 15 to the manifold opening 11b, and then goes up through the manifold opening 12b to be discharged from the air-discharging portion 4b. During this step, the oxygen component in the air permeates the oxygen-permeable membrane 15 to the reaction chamber 1 utilizing the difference in the oxygen concentration between the reaction chambers 1 and 2 as a driving force. So the air discharged from the air-discharging portion 4b is lean in oxygen.

On the other hand, methane and steam supplied from the hydrocarbon gas-introducing portion 3a are guided by the groove 19 of the manifold opening 11a to the reaction chamber 1. The gas flow obtains the oxygen that has permeated the oxygen-permeable membrane 15 and is subjected to partial oxidation reforming and steam reforming reactions, and the resulting hydrogen-containing reformed gas is discharged from the reformed gas-discharging portion 3b, passing through the manifold opening 11b. In addition, the reaction chamber 3 shares the reaction chamber 2 with the reaction chamber 1, and thus experiences the same reaction as in the reaction chamber 1.

In this way, the reforming apparatus according to the present invention enables holding an oxygen-permeable membrane and controlling a gas channel simultaneously, as well as allows a hydrocarbon gas and air to flow mutually perpendicularly into alternate layers. This makes it possible to downsize the reactor.

In addition, the flat plate units do not always have to be in a square shape, which was illustrated in the embodiment, and may be in any shape, such as a circle, as long as the rotation of a unit by 90° makes its four manifold openings aligned to those of another unit.

Furthermore, the kind of the hydrocarbon gas does not always have to be methane, which was illustrated in the embodiment, and may be other kinds of hydrocarbon gases including ethane, propane, butane and heavier ones, liquid fuels (e.g., kerosene, light oil and gasoline) and biogases.

Examples

Next, characterization results of hydrocarbon gas reforming using the reforming apparatus according to the present invention are described. The flat plates used in the characterization were square plates, 60 mm on a side, shown in FIG. 9. The manifold openings were in an oval shape 5 mm in width and 30 mm in length. The number of membranes stacked is as listed in Table 3. As an oxygen-permeable membrane, a composite oxygen-permeable membrane constituted of cerium oxide and spinel oxide was used. The specific composition was $Ce_{0.85}Sm_{0.15}O_{2-d}$-15 vol % $MnFe_2O_4$. This material has been reported to exhibit an oxygen flux density of 10 $\mu mol \cdot cm^{-2} \cdot s^{-1}$ at 1000° C. and a coefficient of thermal expansion of $11 \times 10^{-6}/°$ C. at the temperature range from room temperature to 1000° C. This material was synthesized using a solid-phase reaction and shaped into a membrane 135 μm in thickness and 36 mm on a side by a tape-casting method. The obtained membrane was attached to a separator made of heat-resistant stainless steel that had a coefficient of thermal expansion close to that of the membrane.

In this example, methane ($CH_4$) was used as a hydrocarbon gas. The amount of methane added was 150 sccm per membrane. The chemical formula of the partial oxidation reaction suggests that reforming of 150 sccm of methane requires the addition of 75 sccm of oxygen and thus, stoichiometrically, it requires the addition of 360 sccm of air. However, the actual quantity of air added (500 sccm) was approximately 1.4 times greater than this value. Steam, which was added to cool the membrane, was regulated by controlling the temperature of the bubbler. For example, humidification with the temperature of the bubbler being 80° C. would result in the steam/methane ratio of approximately 0.87. The methane ($CH_4$) conversion ratio, CO selectivity and $H_2$ selectivity were calculated from the gas concentrations ([$CH_4$], [CO], [$CO_2$], [$H_2$] and [$H_2O$]) measured using a gas analyzer, according to the following equations:

[Equation 1]

$$CH_4 \text{ conversion ratio} = ([CO]+[CO_2])/([CH_4]+[CO]+[CO_2]) \times 100 \quad \text{Formula (10)}$$

[Equation 2]

$$CO \text{ selectivity} = [CO]/([CO]+[CO_2]) \times 100 \quad \text{Formula (11)}$$

[Equation 3]

$$H_2 \text{ selectivity} = [H_2]/([H_2]+[H_2O]) \times 100 \quad \text{Formula (12)}$$

Table 2 summarizes the results of this reforming study. It should be noted that Sample 7 at the last row provided excellent reforming characteristics including the oxygen flux density of 5.67 $\mu mol \cdot cm^{-2} \cdot s^{-1}$, the methane conversion ratio of 95.7% and CO selectivity and $H_2$ selectivity exceeding 80%, at a humidification temperature of 80° C.

derived hydrogen were estimated to be 76% and approximately 24%, respectively. The effect of cooling an oxygen-permeable membrane according to the present invention was also demonstrated by the fact that the tests performed at a humidification temperature of 40° C., such as the tests of Samples 1 and 2 in Table 2, experienced breaking of the membranes a few tens of minutes after the addition of methane whereas the tests using the other samples, which were performed at a humidification temperature of 80° C., kept the membranes intact.

Moreover, the quantity of Joule heat generated within an oxygen-permeable membrane and the effect of cooling the membrane were quantitatively examined. Table 3 shows estimated Joule heat generated within the oxygen-permeable membrane for Sample 7. The oxygen flux density (5.67 $\mu mol \cdot cm^{-2} \cdot s^{-1}$) was converted into the current density (2.19 $A \cdot cm^{-2}$), and then the ionic resistance-derived and electronic resistance-derived Joule heat values per unit area were calculated from the film thickness and the electric conductivity.

TABLE 2

| Sample | No. of membranes | Methane flow rate (sccm) | Furnace temperature (° C.) | Air flow rate (sccm) | Humidification temperature (° C.) | Oxygen flux density ($\mu mol \cdot cm^{-2} \cdot s^{-1}$) | CH4 conversion ratio (%) | CO selectivity (%) | $H_2$ selectivity (%) | H2/CO ratio |
|---|---|---|---|---|---|---|---|---|---|---|
| 1 | 1 | 150 | 850 | 800 | 40 | 5.24 | 59.4 | 74.5 | 75.7 | 1.97 |
|  |  | 150 | 840 | 1000 | 40 | 3.93 | 57.1 | 80.0 | 81.3 | 1.97 |
|  |  | 150 | 830 | 1000 | 40 | 3.41 | 55.7 | 82.1 | 83.9 | 2.04 |
| 2 | 1 | 150 | 800 | 600 | 40 | 3.08 | 54.7 | 89.4 | 92.1 | 2.13 |
|  |  | 150 | 800 | 800 | 40 | 3.40 | 53.2 | 85.8 | 89.8 | 2.10 |
| 3 | 1 | 150 | 780 | 600 | 80 | 3.76 | 77.7 | 87.0 | 87.8 | 3.07 |
|  |  | 150 | 780 | 800 | 80 | 4.00 | 76.6 | 87.0 | 86.1 | 3.00 |
|  |  | 150 | 780 | 550 | 80 | 3.73 | 76.3 | 86.6 | 86.8 | 3.03 |
|  |  | 150 | 800 | 600 | 80 | 4.35 | 82.4 | 87.6 | 84.9 | 2.80 |
| 4 | 1 | 150 | 780 | 600 | 80 | 4.38 | 68.3 | 79.9 | 83.0 | 3.03 |
|  |  | 150 | 780 | 400 | 80 | 4.47 | 65.1 | 77.5 | 80.8 | 3.09 |
|  |  | 150 | 780 | 500 | 80 | 4.40 | 63.0 | 77.9 | 79.4 | 3.06 |
|  |  | 150 | 800 | 500 | 80 | 4.68 | 67.7 | 77.3 | 80.5 | 3.07 |
|  |  | 150 | 820 | 500 | 80 | 5.36 | 72.3 | 79.1 | 80.0 | 2.87 |
|  |  | 150 | 820 | 600 | 77 | 6.04 | 72.6 | 79.1 | 76.9 | 2.78 |
| 5 | 2 | 300 | 740 | 1000 | 80 | 3.37 | 64.5 | 79.2 | 86.5 | 3.11 |
|  |  | 300 | 750 | 1000 | 80 | 3.45 | 66.9 | 80.6 | 87.1 | 3.07 |
| 6 | 1 | 150 | 780 | 500 | 80 | 4.02 | 87.5 | 85.8 | 90.8 | 2.78 |
| 7 | 1 | 150 | 780 | 500 | 80 | 5.67 | 95.7 | 83.5 | 88.8 | 2.73 |

FIG. 10 shows the time dependence of methane reforming characteristics of Sample 7. In this drawing, the lower graph indicates the composition of gases and the upper graph indicates the gas flow rate measured at the reactor outlet. Methane was added together with steam 2.4 hours after the start of the measurement. The gas composition indicated in the lower graph demonstrates that the residual amount of methane was sufficiently low, approximately 1%, and that hydrogen and carbon monoxide were produced while maintaining the high selectivity for them. Furthermore, the gas flow rate indicated in the upper graph was increased approximately three times after the addition of methane. This also supports that favorable reforming was achieved without carbon deposition or any other problems. From the production quantity of the synthetic gas, the gas composition and the [$H_2$]/[CO] ratio, the ratio of the partial oxidation reforming reaction to the steam reforming reaction that occurred in the reactor can be estimated. As for Sample 7, percentages of the partial oxidation reforming-derived hydrogen and the steam reforming- These values were multiplied by the effective area of the oxygen-permeable membrane, thereby providing Joule heat generated within the whole membrane, 17.46 W.

TABLE 3

| Oxygen flux density j/$\mu mol \cdot cm^{-2} \cdot s^{-1}$ | Current density i/$A \cdot cm^{-2}$ | Film thickness L/cm | Ionic conductivity $\sigma_{ion}$/S/cm | Electronic conductivity $\sigma_e$/S/cm |
|---|---|---|---|---|
| 5.67 | 2.19 | 0.0135 | 0.10 | 0.05 |

| Joule heat (ion) $W_{ion}$/$cm^2$ | Joule heat (electron) $W_e$/$cm^2$ | Area S/$cm^2$ | Total Joule heat W |
|---|---|---|---|
| 0.65 | 1.29 | 9.00 | 17.46 |

Table 4 shows the heat values of methane consumed in the partial oxidation reforming reaction (76% of all the reactions) and the steam reforming reaction (24% of all the reactions) in the unit of W. The free energy change, $\Delta G$, applied on the oxygen-permeable membrane was −20.3 W. The total Joule heat was 17.46 W as indicated in Table 4, and thus it can be said that as high as 86% of the free energy change, $\Delta G$, was returned to the reaction system as heat together with oxygen.

TABLE 4

|  | Methane flow rate F/sccm | Temperature T/K | ΔG kJ/mol | ΔH kJ/mol | ΔG W | ΔH W | TΔS W |
|---|---|---|---|---|---|---|---|
| Consumed in partial oxidation reforming | 114.0 | 1100.0 | −239.4 | −21.8 | −20.3 | −1.8 | 18.5 |
| Consumed in Steam reforming | 36.0 | 1100.0 | −52.3 | 226.6 | −1.4 | 6.1 | 7.5 |

In addition, the generated Joule heat is absorbed by TΔS of the partial oxidation reaction and the total energy change, ΔH, of the steam reforming, and the potential absorbed quantity thereof is 18.5+6.1=24.6 W. This value is greater than the actual value of generated Joule heat, 17.46 W, suggesting the presence of a margin for cooling capacity. Therefore, it can be said that cooling of an oxygen-permeable membrane using steam reforming provided by the present invention functions effectively.

Here, 75% of the total cooling capacity is derived from the TΔS term of partial oxidation reforming. Also, the membrane degradation observed in the tests performed at a low dew point, such as 40° C., revealed that an important factor of the stable operation of this system is to operate the system basically at the endothermic side as a result of the thermal balance between the partial oxidation reaction and steam reforming. Therefore, the amount of steam (or water) added should correspond to a dew point of at least 50° C., and preferably in the range of 70 to 80° C. Furthermore, it should be noted that the [$H_2$]/[CO] ratios listed at the last column in Table 2 is in the range of 2 to 3 at relatively high humidification temperatures. The tests in which the partial oxidation reaction exclusively progressed provided the values close to two, whereas the tests in which the steam reforming reaction progressed provided the values equal to or higher than three. This demonstrates the presence of a secondary positive effect of the addition of steam to increase the production quantity of hydrogen as well as the primary effect thereof to cool an oxygen-permeable membrane. Also for the increase in the production quantity of hydrogen, the amount of steam (or water) added preferably corresponds to a dew point in the range of 70 to 80° C. This makes 50 to 80% of the total production quantity of hydrogen derived from the partial oxidation reforming reaction and the balance derived from the steam reforming reaction.

From these values, the quantity of hydrogen that can be produced using twenty flat plate units one of which is shown in FIG. 9 is calculated to be 10 liter per minute. This value is equivalent to the hydrogen quantity required by a 1-kW fuel cell. The volume of a reforming apparatus made by stacking these plate units will be 216 cc. The volume of the smallest one of currently developing reforming apparatuses for a 1-kW fuel cell is approximately 19000 cc. This system would obviously provide a sufficiently downsized reforming apparatus even in combination with a component to convert carbon monoxide into carbon dioxide while increasing the quantity of hydrogen (a shift reactor and a carbon monoxide remover). Consequently, it was confirmed that the present invention can be used to realize a downsized and highly efficient oxygen-permeable membrane-based hydrogen production apparatus.

INDUSTRIAL APPLICABILITY

The present invention can be used as a reforming apparatus for a hydrogen station and/or a fuel cell to produce hydrogen. Besides the production of pure hydrogen, it can be used for the production of a synthetic gas containing carbon monoxide and hydrogen, as well as an alcohol, such as methanol, made of such a synthetic gas. It is applicable also to some technical fields including exergy engineering, efficient use of energy and improvement in heat efficiency.

BRIEF DESCRIPTION OF THE DRAWINGS

FIG. 1 is a figure showing a constitution of the reforming apparatus 1 according to an embodiment of the present invention.

FIG. 2 is a figure showing a detailed constitution of the flat plate unit 2A constituting each layer to be stacked of the reforming apparatus 1.

FIG. 3 is a schematic view of the stacked layers of the reforming apparatus 1.

FIG. 4 is a figure showing the time dependence of the free energy change, ΔG, of the partial oxidation reaction.

FIG. 5 is a figure showing the thermodynamic compass of a partial oxidation reaction.

FIG. 6 is a conceptual diagram of an oxygen-permeable membrane-based hydrogen production system.

FIG. 7 is a figure showing the principle of Joule heat removal from an oxygen-permeable membrane.

FIG. 8 is a figure showing the film thickness dependence of the oxygen flux density for a composite oxygen-permeable membrane constituted of cerium oxide and spinel oxide.

FIG. 9 is a figure illustrating the flat plate unit used to make the modified reforming apparatus.

FIG. 10 is a figure showing the time dependence of the methane reforming characteristics.

REFERENCE NUMERALS

1 Reforming apparatus
2A, 2B Flat plate unit
2C Top plate unit
2D Bottom plate unit
3a Starting material gas-introducing portion
3b Reformed gas-discharging portion
4a Air-introducing portion
4b Air-discharging portion
11a, 11b, 12a, 12b Manifold opening
15 Oxygen-permeating membrane
16 Screw hole
17 Flange portion
18 Membrane-holding portion
19 Groove for a gas channel

The invention claimed is:

1. A stacked structure reforming apparatus, comprising pairs of flat plate units each of which has a symmetrical shape with respect to each of two mutually perpendicular central axes extending through the center thereof, the flat plate units of each pair being rotated by 90° from each other, the pairs being stacked so that the flat plate units are alternately arranged, and, a top plate unit and a bottom plate unit that sandwich the pairs of flat plate units, wherein:

each of the flat plate units has a membrane-holding portion that has an opening for a reaction chamber at the center thereof, a specific-gas-permeating membrane that is held by the membrane-holding portion, and a flange portion that surrounds the membrane-holding portion and is one step higher than the membrane-holding portion; and the flange portion has a first gas-introducing manifold opening and a first gas-discharging manifold opening provided along a first central axis of the central axes so as to put the membrane-holding portion therebetween, a second gas-introducing manifold opening and a second gas-discharging manifold opening provided along a second central axis of the central axes, which is perpendicular to the first central axis, so as to put the membrane-holding portion therebetween, and a gas channel that allows the first gas-introducing manifold opening and the first gas-discharging manifold opening to communicate with the membrane-holding portion, wherein the specific-gas-permeating membrane is an oxygen-permeable membrane.

2. The reforming apparatus according to claim 1, wherein the reforming apparatus is an apparatus for reforming a hydrocarbon, and the reforming apparatus is configured so that a hydrocarbon gas and steam flow into the first gas-introducing manifold opening, whereas air flows into the second gas-introducing manifold opening.

3. The reforming apparatus according to claim 1 or 2, wherein the oxygen-permeable membrane is a composite oxygen-permeable membrane constituted of cerium oxide and spinel oxide.

4. The reforming apparatus according to claim 1, wherein the thickness of the oxygen-permeable membrane is in the range of 100 µm to 1 cm.

\* \* \* \* \*